United States Patent
Brown et al.

(10) Patent No.: US 8,303,888 B2
(45) Date of Patent: Nov. 6, 2012

(54) PROCESS OF FORMING A NON-WOVEN CELLULOSE WEB AND A WEB PRODUCED BY SAID PROCESS

(75) Inventors: Douglas B. Brown, Fremont, WI (US); Jeffrey D. Stark, Neenah, WI (US); Carmen A. Granato, Sr., Neenah, WI (US); Duane K. Zacharias, Appleton, WI (US)

(73) Assignee: Reifenhauser GmbH & Co. KG, Troisdorf (DE)

( * ) Notice: Subject to any disclaimer, the term of this patent is extended or adjusted under 35 U.S.C. 154(b) by 1244 days.

(21) Appl. No.: 12/082,504

(22) Filed: Apr. 11, 2008

(65) Prior Publication Data
US 2009/0258562 A1 Oct. 15, 2009

(51) Int. Cl.
| D01D 5/06 | (2006.01) |
| D01D 5/12 | (2006.01) |
| D01D 10/02 | (2006.01) |
| D01F 2/02 | (2006.01) |

(52) U.S. Cl. .............. 264/561; 264/103; 264/178 F; 264/187; 264/203; 264/210.8; 264/211.14; 264/211.17; 264/555; 264/557

(58) Field of Classification Search ............ 264/103, 264/178 F, 187, 203, 210.8, 211.14, 211.15, 264/211.17, 555, 557, 561
See application file for complete search history.

(56) References Cited

U.S. PATENT DOCUMENTS

| 2,387,791 A | * | 10/1945 | Hoffman ............ 264/207 |
| 2,968,834 A | * | 1/1961 | Groombridge et al. ... 264/103 X |
| 4,142,913 A | | 3/1979 | McCorsley, III et al. |
| 4,144,080 A | | 3/1979 | McCorsley, III |
| 4,211,574 A | | 7/1980 | McCorsley, III et al. |
| 4,246,221 A | | 1/1981 | McCorsley, III |
| 4,380,570 A | | 4/1983 | Schwarz |
| 4,416,698 A | | 11/1983 | McCorsley, III |
| 4,426,228 A | | 1/1984 | Brandner et al. |
| 5,167,899 A | * | 12/1992 | Jezic ............ 264/555 X |
| 5,252,284 A | | 10/1993 | Jurkovic et al. |
| 5,330,567 A | | 7/1994 | Zikeli et al. |
| 5,409,532 A | | 4/1995 | Astegger et al. |
| 5,417,909 A | | 5/1995 | Michels et al. |
| 5,476,616 A | | 12/1995 | Schwarz |
| 5,534,113 A | | 7/1996 | Quigley et al. |
| 5,589,125 A | | 12/1996 | Zikeli et al. |

(Continued)

FOREIGN PATENT DOCUMENTS
WO 2005106085 11/2005

*Primary Examiner* — Leo B Tentoni
(74) *Attorney, Agent, or Firm* — Thomas J. Connelly; Wilhelm Law, S.C.

(57) ABSTRACT

A process is disclosed of forming cellulose fibers. The process includes extruding an aqueous solution of cellulose and a solvent through a first member to form filaments. The first member has multiple rows of first and second openings with a nozzle positioned in each of the first openings. At least one of the nozzles in one row is staggered from at least one of the nozzles in an adjacent row. At least a portion of each of the filaments is shrouded in a pressurized gas emitted through each of the first openings. Each of the filaments is contacted with a liquid to remove some of the solvent and transform each of the filaments into a continuous solid fiber. The continuous solid fibers are then collected on a moving surface to form a non-woven cellulose web.

17 Claims, 9 Drawing Sheets

U.S. PATENT DOCUMENTS

| | | |
|---|---|---|
| 5,607,639 A | 3/1997 | Zikeli et al. |
| 6,197,230 B1 | 3/2001 | Pierre et al. |
| 6,235,392 B1 | 5/2001 | Luo et al. |
| 6,306,334 B1 | 10/2001 | Luo et al. |
| 6,773,648 B2 | 8/2004 | Luo et al. |
| 6,824,729 B2 * | 11/2004 | Oin et al. .................. 264/103 X |
| 7,018,188 B2 | 3/2006 | James et al. |
| 2005/0056956 A1 | 3/2005 | Zhao et al. |

* cited by examiner

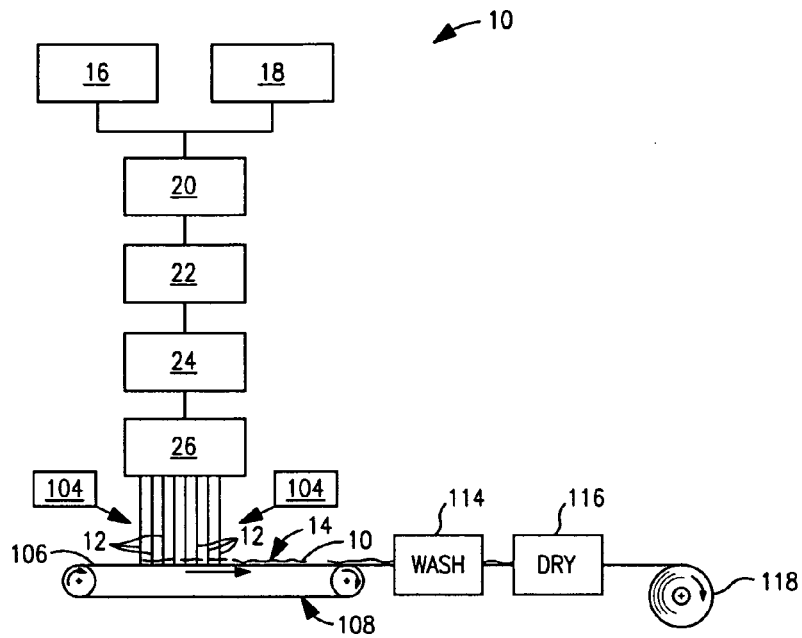
FIG. 1
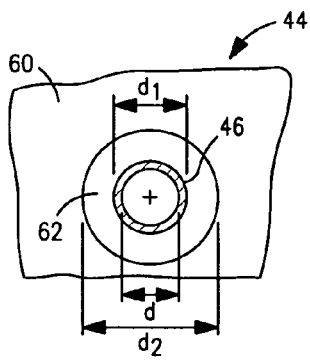 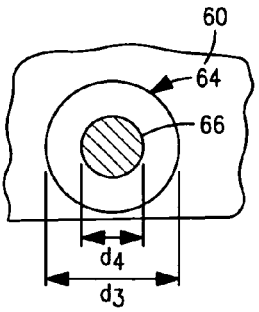 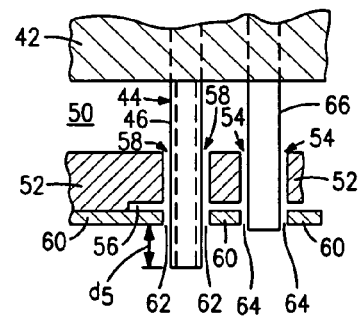
FIG. 3  FIG. 4  FIG. 5
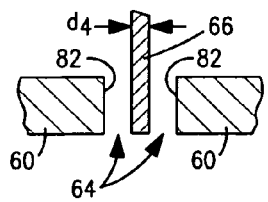 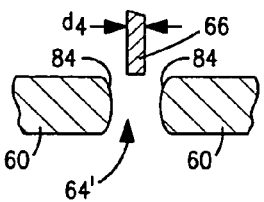
FIG. 6  FIG. 7

PROCESS OF FORMING A NON-WOVEN CELLULOSE WEB AND A WEB PRODUCED BY SAID PROCESS

FIELD OF THE INVENTION

This invention relates to a process of forming a non-woven cellulose web and a web produced by said process.

BACKGROUND OF THE INVENTION

Currently, there are several different methods for extruding an aqueous solution containing cellulose and a water soluble solvent into cellulose fibers. Each of these methods utilizes special equipment to heat the aqueous solution and extrude it through a die block assembly. The die block assembly can include various components for directing and distributing the aqueous solution and pressurized gas through a plurality of nozzles to form a plurality of filaments. The aqueous solution is usually extruded in a downward direction such that the pressurized gas and gravity will cause the aqueous solution to attenuate into a plurality of filaments. The filaments are then contacted with a liquid which causes a major portion of the solvent to solvate into the liquid solution and thus allows the filaments to coagulate into solid cellulose fibers. These solid cellulose fibers are then collected on a moving surface, such as a porous conveyor belt or rotatable drum and form a non-woven web.

Up until now, no one has been able to design and construct an apparatus or process which will allow cellulose fibers having a diameter of less than about 15 microns to be extruded and formed at a throughput that would make such a process economically feasible. In addition, no one has been able to design and construct a spinnerette that extrudes 8 or more filaments per linear centimeter at a throughput of greater than 0.1 grams/hole/minute at a production speed of up to about 750 meters per minute. Furthermore, no one has been able extrude an aqueous solution containing cellulose and a solvent at back pressures of more than 20 bar without damaging the spinnerette. Still further, no one to date has been able to extrude and form very fine cellulose fibers having a diameter of less than 5 micron at a throughput of greater than 0.5 grams/hole/minute at a production speed of up to about 750 meters per minute.

Now a process has been invented which will allow one to extrude and form cellulose fibers each having a diameter of less than about 15 microns at a throughput of greater than about 0.1 grams/hole/minute at a production speed of up to 750 meters per minute. The process is also capable of forming very fine cellulose fibers each having a diameter of less than about 5 microns at a throughput of greater than about 0.5 grams/hole/minute at a production speed of up to 750 meters per minute. Furthermore, a non-woven cellulose web produced by the process has been invented which has having unique characteristics.

SUMMARY OF THE INVENTION

Briefly, this invention relates to a process of forming a non-woven cellulose web and a non-woven cellulose web produced by the process. The process includes the steps of forming an aqueous solution of cellulose and a solvent. This aqueous solution is directed through a spinnerette having multiple rows of nozzles and second openings. The nozzles are different from the second openings. At least one of the nozzles in one of the rows is staggered from at least one of the nozzles in an adjacent row, and each of the nozzles having a first opening aligned adjacent thereto. The aqueous solution is extruded through each of the nozzles to form multiple filaments. At least a portion of each of the filaments is shrouded in a pressurized gas emitted through the adjacent first opening. The filaments are then attenuated into a circular cross-sectional configuration having a diameter of less than about 5 microns. Each of the filaments is contacted with a liquid which chemically reacts with the solvent to remove some of the solvent whereby each of the filaments is transformed into a continuous solid fiber. The continuous solid fibers are then collected on a moving surface to form a non-woven cellulose web.

The general object of this invention is to provide a process of forming a non-woven cellulose web. A more specific object of this invention is to provide a non-woven cellulose web produced by such a process.

Another object of this invention is to provide a process of forming a web from multiple cellulose fibers each having a diameter of less than about 15 microns.

A further object of this invention is to provide a process of forming a non-woven cellulose web having a predetermined strength and pore size.

Still another object of this invention is to provide a process of forming a non-woven cellulose web from an aqueous solution of cellulose and a water soluble solvent, and using pressurized gas to attenuate and accelerate each extruded filament while preventing such fibers from contacting one another.

Still further, an object of this invention is to provide an economical and efficient process of forming a non-woven cellulose web.

Other objects and advantages of the present invention will become more apparent to those skilled in the art in view of the following description and the accompanying drawings.

BRIEF DESCRIPTION OF THE DRAWINGS

FIG. 1 is a schematic of a process of forming cellulose fibers.

FIG. 3 is an end view of a nozzle.

FIG. 4 is an end view of a second nozzle.

FIG. 5 is a partial exploded view of a portion of the spinnerette body shown within the area labeled A.

FIG. 6 is an enlarged, partial cross-sectional view of a second nozzle having a constant inside diameter.

FIG. 7 is an enlarged, partial cross-sectional view of a second nozzle having a venturi.

DETAILED DESCRIPTION OF THE INVENTION

Figure 2:
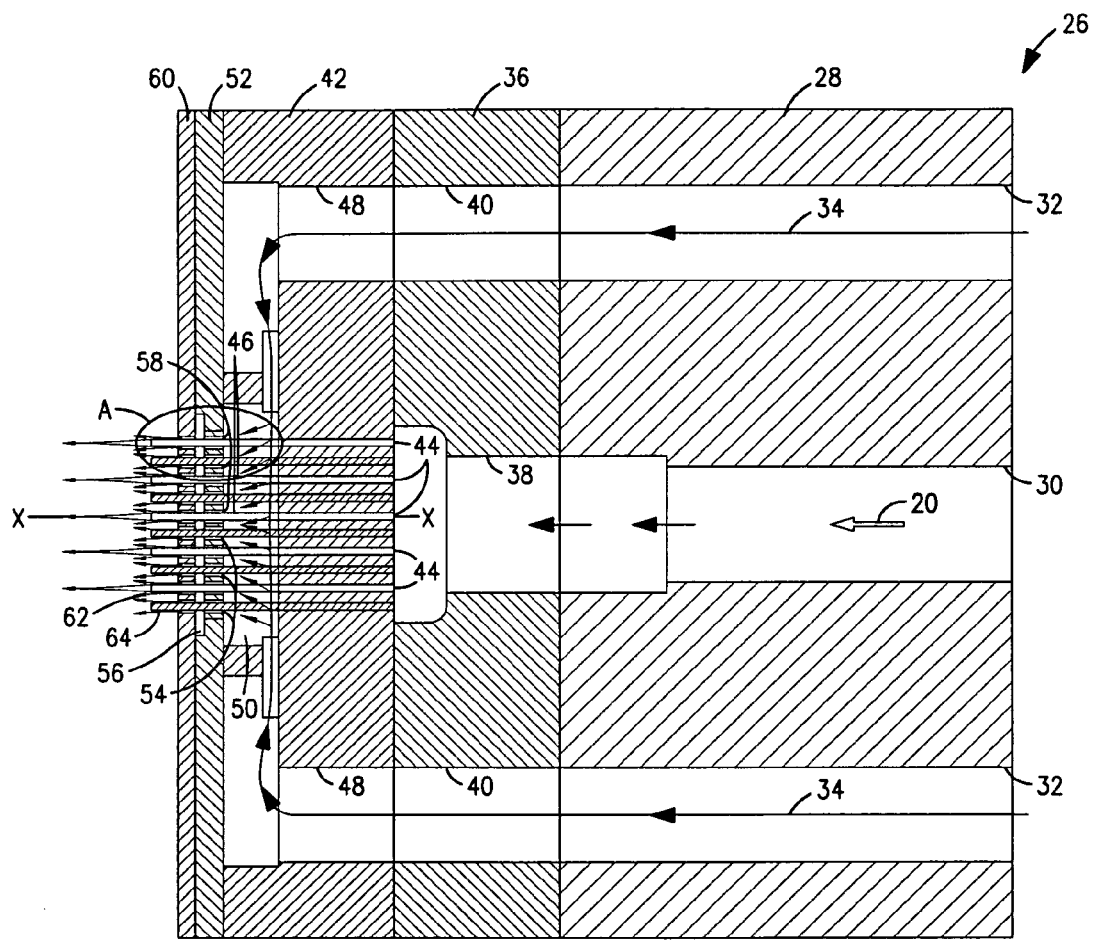
FIG. 2 is a cross-sectional view of a die block assembly showing multiple first and second nozzles.

Referring to FIG. 1, a process 10 of forming cellulose fibers 12 which can be formed into a non-woven web 14 is shown. The process 10 includes the steps of combining and dissolving cellulose 16 and a solvent 18 to form an aqueous solution 20. The aqueous solution 20 is commonly referred to as dope in the industry. The type of raw cellulosic material used can vary. Cellulose is a complex carbohydrate $C_5H_{10}O_5$ that is composed of glucose units which form the main constituent of the cell wall in most plants. The cellulosic material may be bleached or unbleached wood pulp which can be made by various processes of which kraft, pre-hydrolyzed kraft, and sulfite would be exemplary. Many other cellulosic raw materials, including but not limited to: purified cotton linters, plants, grasses, etc. can also be used separately or in combination with wood pulp. The cellulose 16 can be wood pulp from any of a number of commercially available dissolving or non-dissolving grade pulps. Examples of some sources of wood pulp include: The Weyerhaeuser Company, International Paper Company, Sappi Saiccor sulfite pulp, and pre-hydrolyzed kraft pulp from International Paper Company. In addition, the wood pulp can be a high hemi-cellulose with a low degree of polymerization pulp. The cellulosic material can be chopped or shredded into a fine fluff to promote forming an aqueous solution 20 with the solvent 18.

The solvent 18 is desirably a water soluble solvent. For example, the solvent 18 can be an amine oxide, desirably a tertiary amine N-oxide containing a non-solvent for the cellulose, such as water. Representative examples of amine oxide solvents useful in the practice of this invention are set forth in U.S. Pat. No. 5,409,532, issued to Astegger et al. The desired solvent is N-methyl-morpholine-N-oxide (NMMO). Other representative examples of solvents include dimethylsulfoxide (DMSO), dimethylacetamide (DMAC), dimethylforamide (DMF) and caprolactan derivatives. The pulp can be dissolved in an amine oxide solvent by any art recognized means such as set forth in U.S. Pat. Nos. 4,246,221, issued to McCorsley, III; 5,330,567, issued to Zikeli et al. and 5,534,113, issued to Quigley et al. Still other solvents that may be used in this invention include dilute caustic soda, phosphoric acid, a mixture of liquid ammonia/ammonia thiocynate and others. Still another way of making an aqueous solution of the cellulose is described in U.S. Pat. No. 6,306,334 issued to Luo et al.

The aqueous solution 20 is then heated in a heater 22 or by some other type of heating mechanism to a predetermined elevated temperature. The aqueous solution 20 can be heated to a temperature ranging from between about 80° C. to about 140° C. Desirably, the aqueous solution 20 is heated to a temperature of at least 100° C. More desirably, the aqueous solution 20 is heated to a temperature of at least about 110° C. Most desirably, the aqueous solution 20 is heated to a temperature of at least about 120° C.

The aqueous solution 20 of the cellulose 16 and solvent 18 can be made in a known manner, for example, as taught in U.S. Pat. No. 4,246,221, issued to McCorsley, III which is incorporated by reference and made a part hereof. In U.S. Pat. No. 4,246,221, the cellulose is wet in a non-solvent mixture of about 40% NMMO and 60% water. The ratio of cellulose to wet NMMO is about 1:5.1 by weight. The mixture is mixed in a double arm sigma blade mixer for about 1.3 hours under vacuum at about 120° C. until sufficient water has been distilled off to leave about 12%-18% based on NMMO so that a cellulose solution is formed. The resulting dope should contain from about 8% to about 15% cellulose.

The heated aqueous solution 20 is then directed to a dope delivery mechanism 24, for example an extruder, where it is routed through a die block/spinnerette assembly 26. The die block/spinnerette assembly 26 can be directly secured to the dope delivery mechanism 24 or it can be spaced apart from the dope delivery mechanism 24.

It should be noted that even though the preparation of the aqueous solution 20, consisting of cellulose 16 and a water soluble solvent 18, such as aqueous NMMO, is known to those skilled in the art, the apparatus and method of spinning the heated aqueous solution 20 into cellulose fibers 12 is very unique. Up until now, no one has been able to form cellulose fibers 12 each having a diameter of less than about 15 microns at a throughput of greater than 0.1 grams/hole/minute at a production speed of up to about 750 meters per minute. In addition, no one has been able to form very fine cellulose fibers 12 each having a diameter of less than about 5 microns at a throughput of greater than 0.5 grams/hole/minute at a production speed of up to about 750 meters per minute.

Referring now to FIG. 2, the die block/spinnerette assembly 26 includes a die block 28 having a first conduit 30 formed therein through which the heated aqueous solution 20 is routed. The die block 28 also has at least one second conduit 32 formed therein. In FIG. 2, a pair of second conduits 32 is shown in a spaced apart configuration. Each of the second conduits 32 is sized and configured to route or direct a pressurized gas 34 therethrough. Desirably, the pressurized gas 34 is air.

Those skilled in the art should understand that two, three, four or more second conduits 32 can be utilized. For better distribution of the pressurized gas 34, multiple spaced apart, second conduits 32 can be utilized.

The pressurized gas 34 is normally heated to a predetermined elevated temperature. The pressurized gas 34 can be heated to a temperature ranging from between about 100° C. to about 160° C. Desirably, the pressurized gas 34 is heated to a temperature ranging from between about 110° C. to about 160° C. More desirably, the pressurized gas 34 is heated to a temperature ranging from between about 120° C. to about 160° C. Most desirably, the pressurized gas 34 is heated to a temperature of about 120° C. The pressurized gas 34 should have a velocity of at least about 45 meters per second (m/sec.). Desirably, the pressurized gas 34 should have a velocity ranging from between about 45 m/sec. to about 500 m/sec. More desirably, the pressurized gas 34 should have a velocity ranging from between about 50 m/sec. to about 450 m/sec.

It should be evident to one skilled in the art that the cross-sectional area, the internal shape and the internal configuration of each of the conduits 32 can vary. The internal diameter of each of the conduits 32, the material from which each of the conduits 32 are formed of, the back pressure on the pressurized gas 34, the temperature of the pressurized gas 34, the as well as other factors, will influence the velocity of the pressurized gas 34.

The die block/spinnerette assembly 26 also includes a filter block 36 which is secured to the die block 28. The filter block 36 has at least two separate passageways 38 and 40 formed therethrough. The passageway 38 is sized and configured to match up and align with the first conduit 30 so that the heated aqueous solution 20 can be routed through the filter block 36.

The other passageways 40, of which two are shown, are sized and configured to match up and align with the two second conduits 32 so that the pressurized gas 34 can be routed through the filter block 36. It should be understood that the size and shape of the passageways 38 and 40 do not have to be identical to the size and shape of the first and second conduits, 30 and 32 respectively. However, the number of passageways 40 should be equal to the number of conduits 32 and each passageway 40 should be aligned with one of the conduits 32.

The filter block 36 serves to filter particulate matter, such as non-dissolved pulp, solution grit, etc. from the aqueous solution 20.

Referring to FIGS. 2 and 3, the die block/spinnerette assembly 26 further includes a first member 42 which can be a spinnerette. The first member 42 is secured to the filter block 36. The filter block 36 is sandwiched between the die block 28 and the first member or spinnerette 42. The first member 42 has multiple nozzles 44 arranged in rows and/or columns or in some other desired pattern. Each of the nozzles 44 can be formed from a metal such as steel, stainless steel, a metal alloy, a ferrous metal, etc. Desirably, each of the nozzles 44 is formed from stainless steel. Each of the nozzles 44 is shown as an elongated, hollow tube 46. By "tube" it is meant a hollow cylinder, especially one that conveys fluid or functions as a passage. Each of the hollow cylindrical tubes 46 has a longitudinal central axis X-X and a uniquely shaped cross-section. Desirably, the cross-section is circular but almost any geometrical cross-section can be utilized. The cross-section should be constant. Each of the hollow cylindrical tubes 46 has an inside diameter d and an outside diameter $d_1$. The inside diameter d can range from between about 0.125 millimeters (mm) to about 1.25 mm. The outside diameter $d_1$ should be at least about 0.5 mm. Desirably, the outside diameter $d_1$ of each of the hollow cylindrical tubes 46 can range from between about 0.5 mm to about 2.5 mm.

The heated aqueous solution 20 is extruded through the inside diameter d of each of the hollow cylindrical tubes 46. The back pressure on the heated aqueous solution 20 present in the passageway 38 of the filter block 36 or in each of the hollow cylindrical tubes 46 should be equal to or exceeds about 5 bar. By "bar" it is meant a unit of pressure equal to one million ($10^6$) dynes per square centimeter. Desirably, the back pressure on the heated aqueous solution 20 present in each of the hollow cylindrical tubes 46 can range from between about 20 bar to about 200 bar. More desirably, the back pressure on the heated aqueous solution 20 present in each of the hollow cylindrical tubes 46 can range from between about 25 bar to about 150 bar. Even more desirably, the back pressure on the heated aqueous solution 20 present in each of the hollow cylindrical tubes 46 can range from between about 30 bar to about 100 bar.

The first member or spinnerette 42 also has at least one other passage 48 formed therein. In FIG. 2, two spaced apart passages 48 are depicted, each of which is sized and configured to align with one of the two passageways 40 formed through the filter block 36. The passages 48 are connected to an enlarged chamber 50 formed on one surface of the first member or spinnerette 42. The enlarged chamber 50 can be centrally located about the longitudinal central axis X-X of each of the hollow cylindrical tubes 46. The enlarged chamber 50 is spaced away from and aligned opposite to the surface of the first member or spinnerette 42 that is secured to the filter block 36. The size, depth and shape of the enlarged chamber 50 can vary. Desirably, the enlarged chamber 50 has a circular shape with a depth of at least 0.1 inches. More desirably, the enlarged chamber 50 has a circular shape with a depth of at least 0.2 inches. The passages 48 function to direct the pressurized gas 34 from the passageways 40 to the enlarged chamber 50 of the spinnerette 42.

It should be understood that since the number of passageways 40 formed in the filer block 36 can vary, the number of passages 48 formed in the first member or spinnerette 42 can also vary. Desirably, there will be an equal number of passages 48 formed in the first member or spinnerette 42 to correspond and align with the number of passageways 40 formed in the filter block 36. As stated above, better distribution of the pressurized gas 34 may be possible when a greater number of passageways 40 and passages 48 are utilized. For example, twelve passageways 40 can be formed in the filter block 36 and each can be aligned with one of the twelve passages 48 formed in the first member or spinnerette 42. Each of the twelve passageways 40, as well as each of the twelve passages 48, can be spaced approximately 30 degrees apart from an adjacent passageway 40 or passage 48 respectively, when viewing the filter block 36 and the first member or spinnerette 42 from one end. Better distribution of the pressurized gas 34 correlates with more uniformly formed cellulose fibers 12.

Still referring to FIG. 2, the die block/spinnerette assembly 26 further includes a second member in the form of a gas distribution plate 52. The second member is secured to the first member or spinnerette 42. The first member or spinnerette 42 is sandwiched between the filter block 36 and the second member or gas distribution plate 52. The second member or gas distribution plate 52 has multiple corridors 54 formed therein. The second member or gas distribution plate 52 also has a chamber 56 spaced away from and aligned opposite to the surface of the second member or gas distribution plate 52 that is secured to the first member or spinnerette 42. The corridors 54 connect the enlarged chamber 50 to the chamber 56. The chamber 56 can be centrally located about the longitudinal central axis X-X of each of the hollow cylindrical tubes 46. The size, depth and shape of the chamber 56 can vary. The corridors 54 function to route the pressurized gas 34 through the second member or gas distribution plate 52. The second member or gas distribution plate 52 also has multiple openings 58 formed therethrough which are separate and distinct from the corridors 54. Each of the multiple openings 58 is sized to permit one of the multiple nozzles 44, in the form of the elongated, hollow cylindrical tubes 46, to pass therethrough. Desirably, each of the multiple openings 58 has a circular cross-section with a diameter $d_2$ that is larger than the outside diameter $d_1$ of each of the hollow cylindrical tubes 46. In other words, the outside diameter $d_1$ of each of the hollow cylindrical tubes 46 does not form a snug or an interference fit with the inside diameter $d_2$ of each of the multiple openings 56.

It should be understood that additional smaller holes or passages can also be formed in the second member or gas distribution plate 52 to allow pressurized gas to pass therethrough.

Referring again to FIGS. 2 and 3, the die block/spinnerette assembly 26 includes a third member in the form of an exterior plate 60. The third member or exterior plate 60 is secured to the second member or gas distribution plate 52. The second member or gas distribution plate 52 is sandwiched between the first member or spinnerette 42 and the third member or exterior plate 60. The third member or exterior plate 60 has multiple first openings 62 formed therethrough. Each of the multiple first openings 62 is sized to freely permit one of the multiple nozzles 44, in the form of an elongated, hollow cylindrical tube 46, to pass therethrough, see FIG. 3. Each of the hollow cylindrical tubes 46 can extend outward or downward beyond the third member or exterior plate 60. The distance the free end of each of the hollow cylindrical tubes 46 extends beyond the exterior plate 60 can vary. Alternatively, each of the hollow cylindrical tubes 46 can stop short of the third member or exterior plate 60.

Each of the nozzles 44 has a first openings 62 formed adjacent thereto. Desirably, each of the first openings 62 is concentrically aligned about each of the nozzles 44. Each of the multiple first openings 62 can have a uniquely shaped cross-section with an inside diameter $d_2$, see FIG. 3. Desirably, each of the multiple first openings 62 has a circular cross-section. The inside diameter $d_2$ of each of the first openings 62 can vary. Desirably, each of the first openings 62 has the same inside diameter $d_2$. More desirably, the inside diameter $d_2$ of each of the first openings 62 is at least 7.5 mm. Even more desirably, the inside diameter $d_2$ of each of the first openings 62 is at least 10 mm. Most desirably, the inside diameter $d_2$ of each of the first openings 62 is at least 12 mm.

The inside diameter $d_2$ of each of the first openings 62 should be greater than the outside diameter $d_1$ of each of the hollow cylindrical tubes 46. Each of the first openings 62 is connected to the chamber 56 formed in the second member or gas distribution plate 52. Each of the first openings 62 is capable of emitting pressurized gas 34 therethrough such that the pressurized gas 34 at least partially surrounds the heated aqueous solution 20 extruded from each of the nozzles 44. Desirably, each of the first openings 62 completely surrounds the heated aqueous solution 20 extruded from each of the nozzles 44 and this pressurized air shrouds or forms a curtain around the heated aqueous solution 20 extruded from each of the nozzles 44.

Referring to FIGS. 2 and 4, the third member or exterior plate 60 also has multiple second openings 64 formed therethrough which are connected to the chamber 56 formed in the second member or gas distribution plate 52. Each of the multiple second openings 64 has a uniquely shaped cross-section through which the pressurized gas 34 can be emitted. Desirably, each of the multiple second openings 64 has a circular cross-section. Each of the multiple second openings 64 has an inside diameter $d_3$. Desirably, the inside diameter $d_3$ is of a single dimension. The inside diameter $d_3$ of each of the multiple second openings 64 can vary. Desirably, the inside diameter $d_3$ of each of the multiple second openings 64 is of the same dimension. More desirably, the inside diameter $d_3$ of each of the second openings 64 is equal to the inside diameter $d_2$ of each of the first openings 62. More desirably, the inside diameter $d_3$ of each of the second openings 64 is at least 0.75 mm. Even more desirably, the inside diameter $d_3$ of each of the second openings 64 is at least 1.0 mm. Most desirably, the inside diameter $d_3$ of each of the second openings 64 is at least 1.2 mm.

Each of the second openings 64 can be positioned adjacent to one of the first openings 62. Each of the first and second openings, 62 and 64 is aligned parallel to one another. Alternatively, two or more of each of the second openings 64 can be positioned adjacent to one of the first openings 62. In some embodiments, three (3) to eight (8) of the second openings 64 can be positioned adjacent to one of the first openings 62. Still further, each of the second openings 64 can also be positioned adjacent to one of the nozzles 44 in each of the rows or in each of an adjacent row. Many different patterns or arrays can be utilized wherein the arrangement of the multiple first and second openings, 62 and 64 respectively, can be varied.

Each of the second openings 64 is spaced from between about 1 mm to about 3.8 mm from the longitudinal central axis $X_1$-$X_1$ of each of the nozzles 44. Desirably, each of the second openings 64 is spaced from between about 1 mm to about 2.5 mm from the longitudinal central axis X-X of each of the nozzles 44.

Referring to FIGS. 2 and 4, each of the multiple second openings 64 can have a stationary, elongated central pin or shaft 66 positioned therein. The elongated central pin 66 has a constant outer diameter $d_4$ and is secured to the spinnerette 42, see FIG. 2. The diameter $d_4$ of the central pin 66 can vary. Desirably, the diameter $d_4$ of the central pin 66 is at least 0.25 mm. More desirably, the diameter $d_4$ of the central pin 66 is at least 0.5 mm. Even more desirably, the diameter $d_4$ of the central pin 66 is at least 0.64 mm. Most desirably, the diameter $d_4$ of the central pin 66 is at least 0.75 mm.

Referring to FIG. 5, the stationary central pin 66 is shown being positioned parallel and adjacent to one of the hollow cylindrical tubes 46. The pressurized gas 34 can follow a straight or a circuitous route through the second member or gas distribution plate 62 and the third member or exterior plate 60 such that it will form an envelope, shroud or curtain of pressurized gas 34 around at least a portion of the circumference of the hollow cylindrical tube 46. By "shrouding" it is meant something that conceals, protects, or screens. In addition, the pressurized gas 34 existing through the adjacent second opening 64 will provide a barrier or veil which will limit or prevent the heated aqueous solution 20, extruded out of each of the nozzles 44, i.e. hollow cylindrical tubes 46, from contacting, touching and/or bonding to the heated aqueous solution 20 extruded from an adjacent nozzle 44. By "veil" it is meant something that conceals, separates, or screens like a curtain. In short, the pressurized gas 34 emitted through the multiple second openings 64 will form pressurized gas streams which will limit or prevent individual filaments from joining with one or more other filaments and forming ropes and/or bundles. Desirably, the pressurized gas 34 can form an envelope, shroud or curtain around the entire circumference of each of the hollow cylindrical tubes 46. The velocity and pressure of the pressurized gas 34 can be varied to suit one's equipment.

Still referring to FIG. 5, one can clearly see that the hollow cylindrical tube 46 extends downward beyond the first opening 62 by a vertical distance $d_5$ which is at least 1 mm. Desirably, the vertical distance $d_5$ is at least 3 mm, and more desirably, the vertical distance $d_5$ is at least 5 mm.

In FIGS. 4 and 5, each of the multiple second openings 64 completely surrounds the central pin 66 such that the pressurized gas 34 can be emitted about the entire outer circumference of each of the central pins 66. One can view the pressurized gas 34 exited from each of the second openings 64 as shrouding or forming a veil about or around the heated aqueous solution 20 extruded from each of the nozzles 44.

Referring now to FIGS. 6 and 7, the central pin 66 in each of the second openings 64 has a constant outer diameter $d_4$. In FIG. 6, the central pin 66 is coaxially aligned within the second opening 64 such that a sidewall 82 of the second opening 64 is aligned parallel to the elongated central pin 66. The sidewall 82 is also aligned perpendicular to the second opening 64. In this embodiment, an even discharge of pressurized gas 34 is emitted about the entire circumference of the central pin 66. Alternatively, one can utilize a second opening 64' which has a venturi configuration, see FIG. 7. By "venturi" it is meant a constricted throat in a gas passage used to increase the velocity of the passing gas. Each of the multiple second openings 64' has a sidewall 84 which has a venturi shape. For example, the sidewall 84 has a convex shape which can form a restricted passageway about or below the circumference of the central pin 66. The convex shape of the sidewall 84 increases the velocity of the pressurized gas 34 passing therethrough. In some applications, this design may be desirable.

It should be noted that in FIG. 6, the terminal end of the central pin 66 is flush with the outer surface of the exterior plate 60 while in FIG. 7, the terminal end of the central pin 66 is located inward from the outer surface of the exterior plate 60. Alternatively, the terminal end of the central pin 66 can be located within the thickness of the exterior plate 66.

Figure 8:
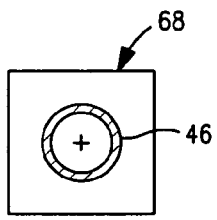
FIG. 8 is an end view of an alternative design for the first opening.
Figure 9:
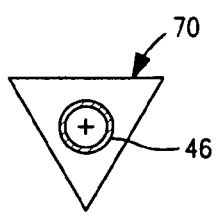
FIG. 9 is an end view of still another embodiment for the first opening.
Figure 10:
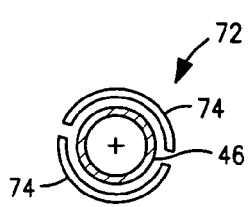
FIG. 10 is an end view of a further embodiment for the first opening.
Figure 11:
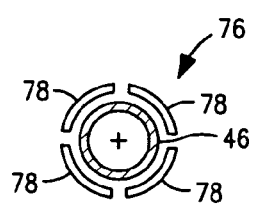
FIG. 11 is an end view of still another embodiment for the first opening.
Figure 12:
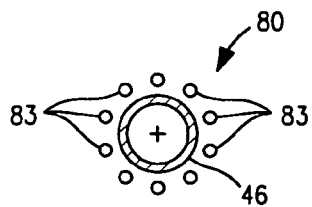
FIG. 12 is an end view of still another embodiment for the first opening.

Referring now to FIGS. 8-12, alternative embodiments for the first opening 62 are depicted. In FIG. 8, a first opening 68 is shown having a square configuration with a hollow cylindrical tube 46 positioned therein. In FIG. 9, a first opening 70 is shown having a triangular configuration with a hollow cylindrical tube 46 positioned therein. In FIG. 10, a first opening 72 is shown having of two crescent shape slots 74 spaced apart from a hollow cylindrical tube 46. In FIG. 11, a first opening 76 is shown having four shorter crescent shape slots 78 spaced apart from a hollow cylindrical tube 46 and from one another. Lastly, in FIG. 12, a first opening 80 is shown having a plurality of circular holes 83 spaced apart from a hollow cylindrical tube 46. In FIG. 12, ten circular holes are shown each being equally spaced apart from one another. It should be understood by one skilled in the art that the actual number of holes 83 can vary. Likewise, various arrangements for the first openings 62 can be utilized.

Figure 13:
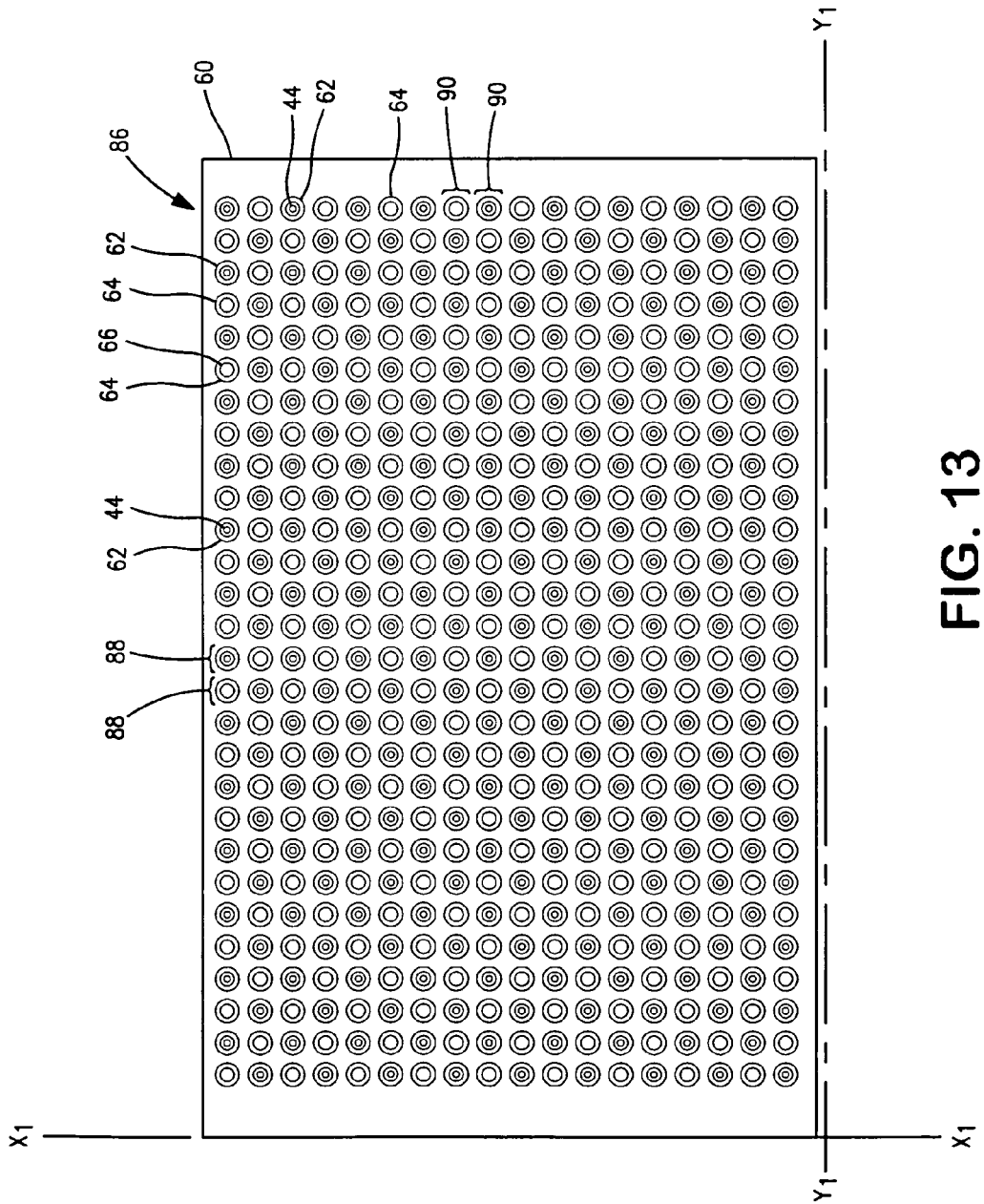
FIG. 13 is a plane view of an array of first and second nozzles formed in an exterior plate.

Referring to FIG. 13, an array 86 is shown which includes a plurality of the first openings 62, each having a nozzle 44 positioned therein, and a plurality of the second openings 64 formed in the third member or exterior plate 60. The array 86 has a longitudinal central axis $X_1$-$X_1$ and a transverse central axis $Y_1$-$Y_1$. The array 86 includes a plurality of columns 88 aligned parallel to the longitudinal central axis $X_1$-$X_1$ and a plurality of rows 90 aligned parallel to the transverse central axis $Y_1$-$Y_1$. In the array 86, the number of columns 88 and the number of rows 90 can each vary. The number of columns 88 can be greater than, equal to or less than the number of rows 90. Desirably, the number of columns 88 exceeds the number of rows 90. The number of columns 88 can be an even number or an odd number. Likewise, the number of rows 90 can be an even number or an odd number. The number of columns 88 can range from between about 1 per spinnerette to about 1,000 per spinnerette. Desirably, the number of columns 88 can range from between about 2 per spinnerette to about 800 per spinnerette. More desirably, the number of columns 88 can range from between about 10 per spinnerette to about 500 per spinnerette. Even more desirably, the number of columns 88 can range from between about 20 per spinnerette to about 250 per spinnerette. In FIG. 13, the exterior plate 60 is shown with an even number of columns 88 and an even number of rows 90.

The number of rows 90 can range from between about 1 per spinnerette to about 100 per spinnerette. Desirably, the number of rows 90 can range from between about 2 per spinnerette to about 50 per spinnerette. More desirably, the number of rows 90 can range from between about 3 per spinnerette to about 25 per spinnerette. Even more desirably, the number of rows 90 can range from between about 6 per spinnerette to about 18 per spinnerette. Most desirably, the exterior plate 60 will contain at least about 10 rows 90 per spinnerette. In FIG. 13, eighteen rows 90 are present.

One will also notice that each of the nozzles 44, positioned in each of the columns 88, is offset or staggered from a nozzle 44 positioned in an adjacent column 88. By "staggered" it is meant to place on or as if on alternating sides of a centerline; set in a zigzag row or rows. Likewise, each of the nozzles 44, positioned in each of the rows 90, is offset or staggered from a nozzle 44 positioned in an adjacent row 90. Desirably, at least one of the nozzles 44 in one of the columns or rows, 88 or 90 respectively, is staggered from at least one of the nozzles 44 present in an adjacent column or row, 88 or 90 respectively. More desirably, at least two of the nozzles 44 in one of the columns or rows, 88 or 90 respectively, is staggered from at least two of the nozzles 44 present in an adjacent column or row, 88 or 90 respectively. Even more desirably, at least three of the nozzles 44 in one of the columns or rows, 88 or 90 respectively, is staggered from at least three of the nozzles 44 present in an adjacent column or row, 88 or 90 respectively.

It has been recognized that in order to achieve uniform and high quality formation of the cellulose fibers 12, the nozzles 44 should be staggered so that as the heated aqueous cellulose solution 20 is extruded into multiple filaments, each of the multiple filaments can remain separate and distinct. By establishing a minimum distance between two adjacent nozzles 44, the filaments extruded therefrom will not touch or bond to one another. The staggering of the nozzles 44 also minimizes the pressurized gas streams exiting from one of the nozzles 44 from interfering with the pressurized gas streams associated with a neighboring nozzle 44.

Still referring to FIG. 13, the third member or exterior plate 60 has at least about 8 of the first and second openings, 62 and 64 respectively, per linear centimeter. The number of first openings 62 can be equal to or be different from the number of second openings 64. The inside diameter $d_2$ of each of the first openings 62 can be equal to or be different from the inside diameter $d_3$ of the second openings 64 or 64'. Desirably, the third member or exterior plate 60 has at least about 20 of the first and second openings, 62 and 64 respectively, per linear centimeter. More desirably, the a hollow cylindrical tube 46 exterior plate 60 has at least about 40 of the first and second openings, 62 and 64 respectively, per linear centimeter. Still more desirably, the third member or exterior plate 60 has at least about 60 of the first and second openings, 62 and 64 respectively, per linear centimeter. Most desirably, the third member or exterior plate 60 has at least about 90 of the first and second openings, 62 and 64 respectively, per linear centimeter.

It should be apparent to one skilled in the art that many different arrays can be constructed and utilized. For example, one could form an array in the third member or exterior plate 60 that has at least six rows 90 per spinnerette and each of the rows 90 includes an equal number of the first and second openings, 62 and 64 respectively. Alternatively, one could form an array in the third member or exterior plate 60 that has at least ten rows 90 per spinnerette and each of the rows 90 includes at least two of the first openings 62, i.e. two of the nozzles 44, and at least two of the second openings 68. Furthermore, one could form an array in the third member or exterior plate 60 that has at least ten rows 90 per spinnerette and each of the rows 90 contains an unequal number of the first and second openings, 62 and 64 respectively.

Regardless of the particular array one selects, it should be noted that by offsetting one of the first openings 62, with one of the nozzles 44 located therein, in one of the columns 88 or rows 90, from one of the first openings 62 present in an adjacent column 88 or row 90, one can increase the distance between adjacent first openings 62. Likewise, the distance between two adjacent nozzles 44 is also increased. As this distance is increased, the likelihood that a filament extruded from one of the nozzles 44 will contact or touch a filament extruded from the adjacent nozzle 44 is decreased. Each of the first openings 62, in FIG. 13, is shown to contain a nozzle 44. By limiting or preventing such contact, one can form individual filaments that can attenuate into very fine cellulose fibers. By "attenuate" it is meant to make slender, fine, or small. Each of the filaments are then coagulated, as well be explained later, to form a soft, solid cellulose fiber. By "coagulate" it is meant to cause a transformation of a liquid into a soft, solid mass.

Figure 14:
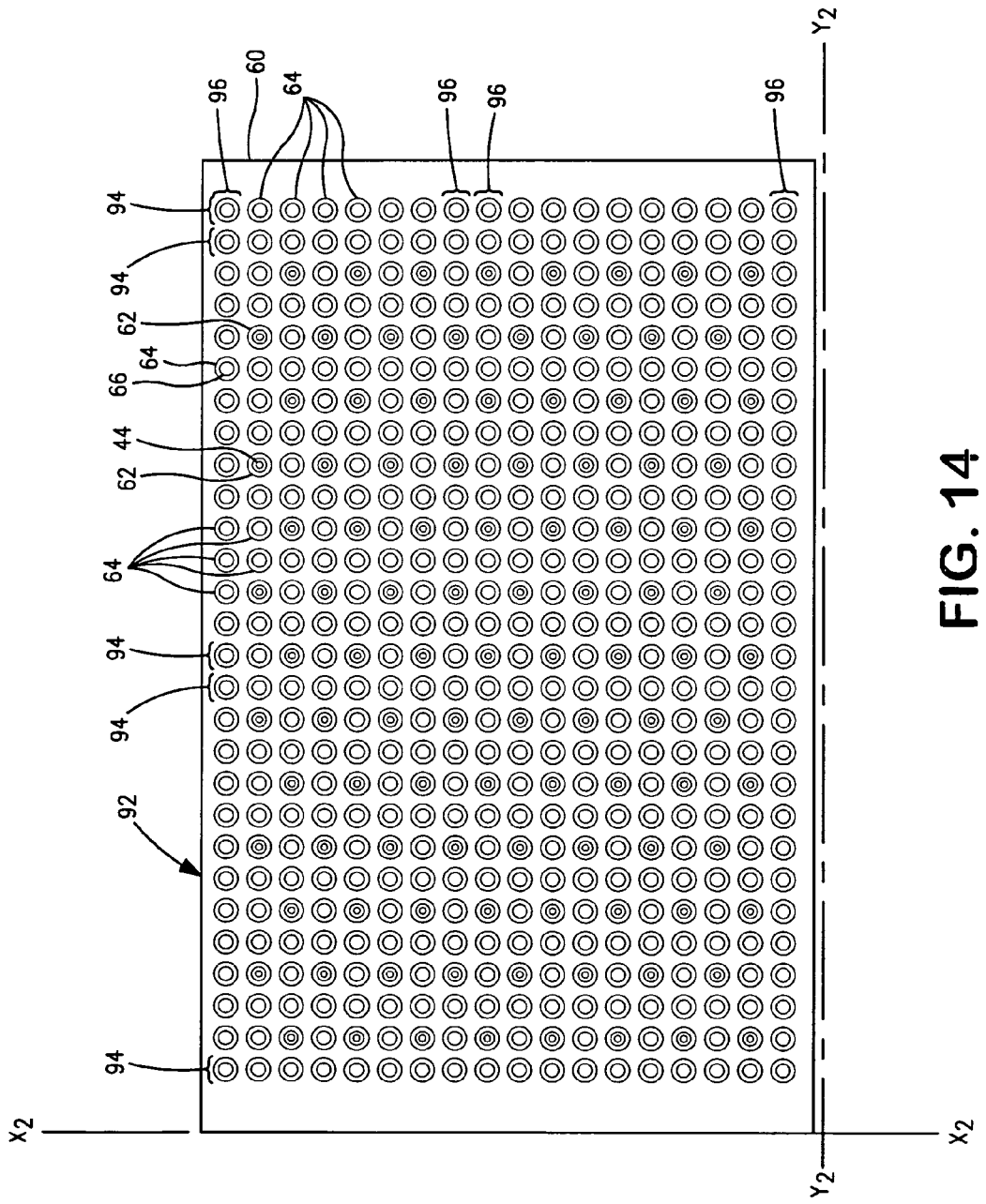
FIG. 14 is a plane view of an alternative array of first and second nozzles formed in an exterior plate.

Referring now to FIG. 14, a second array 92 is shown which includes a plurality of the first openings 62 and a plurality of the second openings 64 formed in the third member or exterior plate 60. Each of the first openings 62 has a nozzle 44 positioned therein. The array 92 has a longitudinal central axis $X_2$-$X_2$ and a transverse central axis $Y_2$-$Y_2$. The array 92 includes a plurality of columns 94 aligned parallel to the longitudinal central axis $X_2$-$X_2$ and a plurality of rows 96 aligned parallel to the transverse central axis $Y_2$-$Y_2$. In the array 92, the number of columns 94 and the number of rows 96 can each vary as was explained above with reference to FIG. 13. One noticeable difference, between the array 86, shown in FIG. 13, and the array 92, shown in FIG. 14, is that in the array 92, every other column 94, as well as the two outer rows 96, contains only the second openings 64. This creates a pattern wherein each of the nozzles 44 is surrounded by eight of the second openings 64. This means that eight pressurized gas streams are present to separate and shroud each filament extruded from each of the nozzles 44 from contacting or touching an adjacent filament. By keeping each filament separate, one can limit or eliminate roping and/or bundling of the filaments and thereby obtain multiple fine cellulose fibers.

Still referring to FIG. 14, one will also notice that the outer columns 94, 94 on the left and right sides of the array 92 and the outer rows 96 on the top and bottom of the array 92 are void of the first openings 62 and the nozzles 44. This pattern is not required but can assist in limiting air turbulence on each end of the array 92. In addition, one can further limit air turbulence by making the two columns 94, 94, located on the right side of the Figure void of the first openings 62 and the nozzles 44, as shown. Likewise, the outer two columns 94, 94 on the left side of the array, as well as the outer two rows 96, 96 on the top and bottom of the array 92 can also be made void of the first openings 62 and the nozzles 44.

Figure 15:
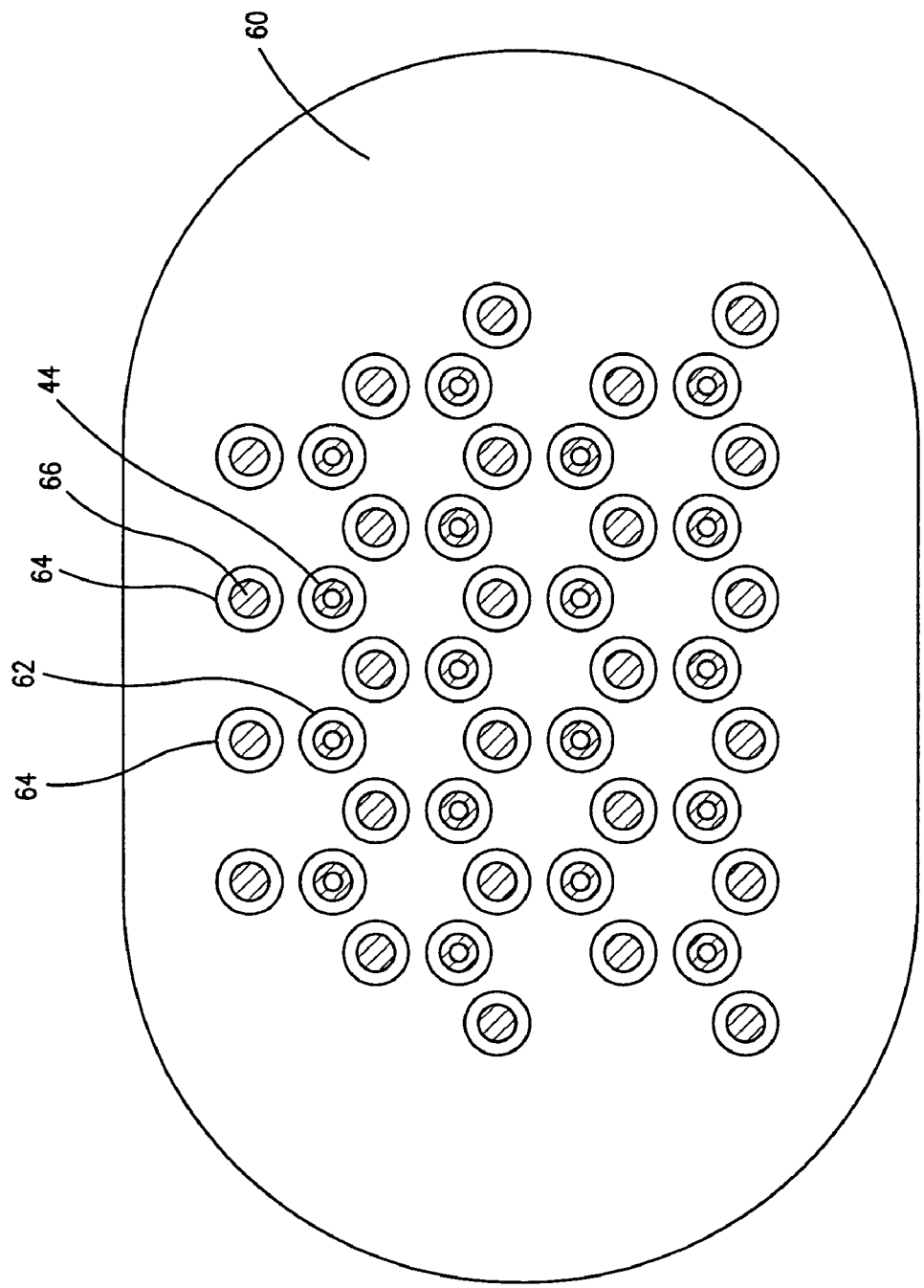
FIG. 15 is a plane view of an array wherein each nozzle is surrounded by three of the second openings.
Figure 16:
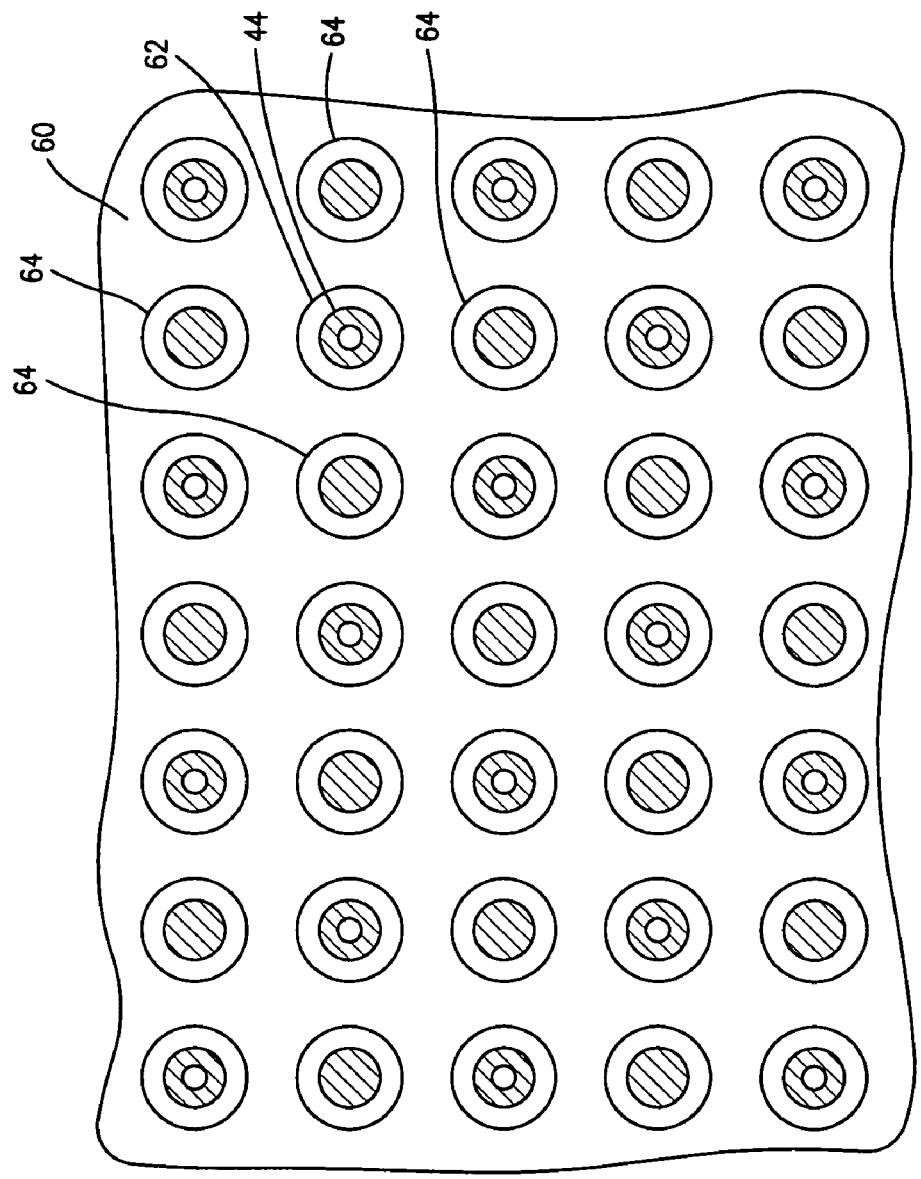
FIG. 16 is a plane view of an array wherein each nozzle is surrounded by four of the second openings.
Figure 17:
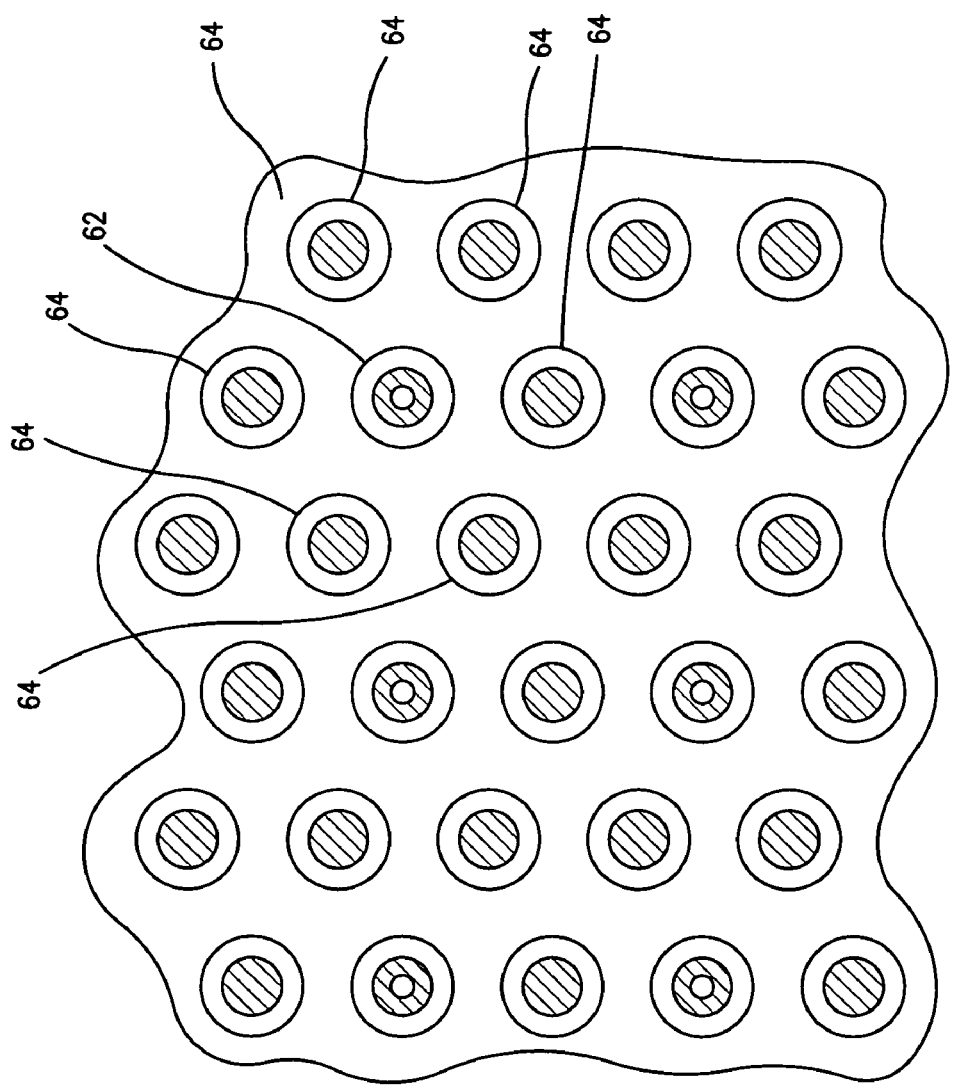
FIG. 17 is a plane view of an array wherein each nozzle is surrounded by six of the second openings.
Figure 18:
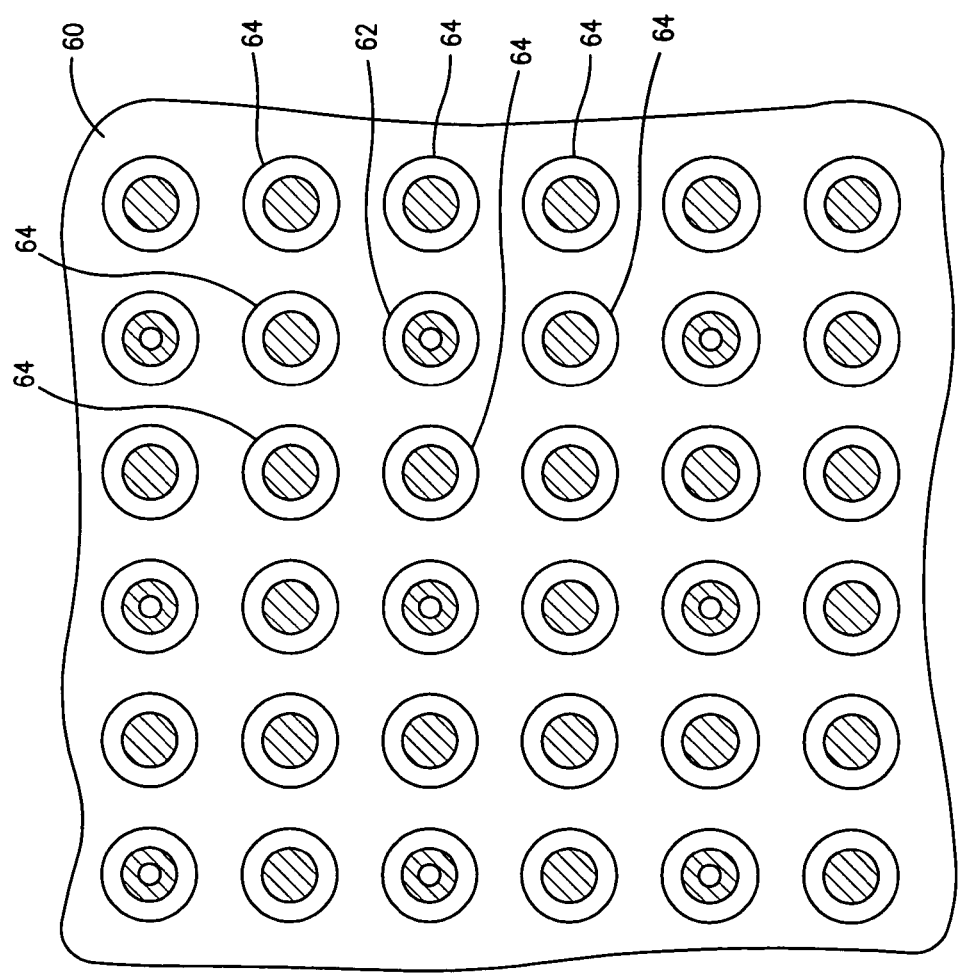
FIG. 18 is a plane view of an array wherein each nozzle is surrounded by eight of the second openings.

Referring to FIGS. 15-18, four different arrays are depicted. In FIG. 15, the third member or exterior plate 60 contains a plurality of first and second openings, 62 and 64 respectively. In this array, each of the first openings 62 contains a nozzle 44 and each of the first openings 62 is surrounded by three of the second openings 68 through which pressurized gas is routed. This is referred to as a "three hole" pattern. In FIG. 16, the third member or exterior plate 60 contains a plurality of first and second openings, 62 and 64 respectively. In this array, each of the first openings 62 contains a nozzle 44 and each of the first openings 62 is surrounded by four of the second openings 64 through which pressurized gas is routed. This is referred to as a "four hole" pattern. In FIG. 17, the third member or exterior plate 60 contains a plurality of first and second openings, 62 and 64 respectively. In this array, each of the first openings 62 contains a nozzle 44 and each of the first openings 62 is surrounded by six of the second openings 64 through which pressurized gas is routed. Each of the second openings 64 is spaced approximately 60 degrees apart from an adjacent second opening 62. This is referred to as a "six hole" pattern. In FIG. 18, the third member or exterior plate 60 contains a plurality of first and second openings, 62 and 64 respectively. In this array, each of the first openings 62 contains a nozzle 44 and each of the first openings 62 is surrounded by eight of the second openings 64 through which pressurized gas is routed. Each of the second openings 64 is spaced approximately 45 degrees apart from an adjacent second opening 62. This is referred to as an "eight hole" pattern.

Figure 19:
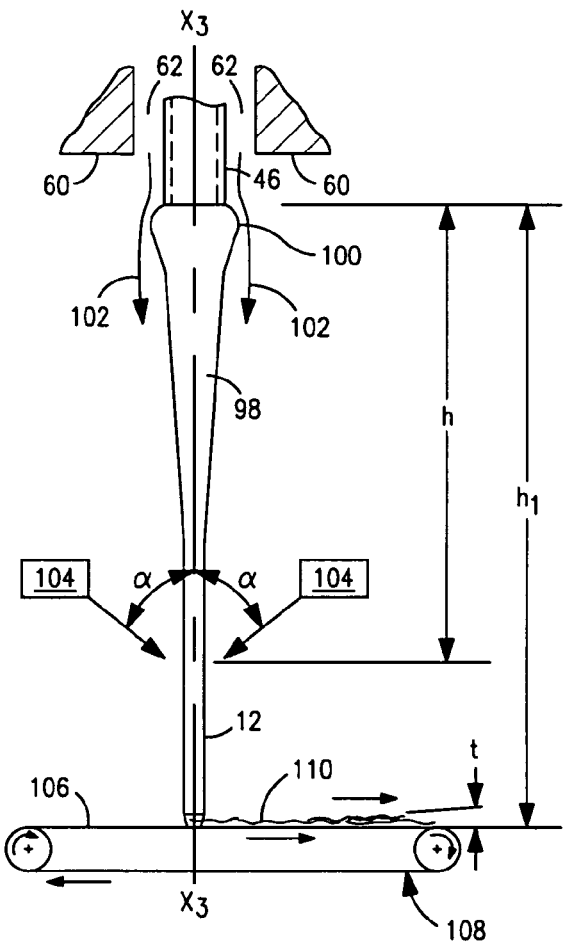
FIG. 19 is an enlarged cross sectional view of a nozzle showing a filament being extruded therefrom.

Referring to FIGS. 1, 13 and 19, the process 10 further includes directing the heated aqueous solution 20 through each of the nozzles 44 formed in the first member or spinnerette 42. The first member or spinnerette 42 has multiple rows 90 of the first openings 62 each containing one of the nozzles 44. The first member or spinnerette 42 also has a plurality of second openings 64 formed therein. The first openings 62 differ from the second openings 64 in that each of the first openings 62 has a nozzle 44 positioned therein. In the first member or spinnerette 42, at least one of the nozzles 44, located in a row 90, is staggered from at least one of the nozzles 44 located in an adjacent row 90. Each of the nozzles 44 is concentrically arranged within each of the first openings 62 and one or more of the second openings 64 are located adjacent to each of the nozzles 44.

The heated aqueous solution 20 is extruded through the hollow cylindrical tube 46 of each of the nozzles 44 at a predetermined back pressure. The back pressure should be at least 10 bar to form a filament 98. The back pressure can range from between about 10 bar to about 200 bar as was explained earlier. The velocity of the heated aqueous solution 20 exiting the nozzle 44, including the adjacent air stream, should be at least about 100 meters per second. Desirably, the velocity of the heated aqueous solution 20 exiting the nozzle 44, including the adjacent air stream, should be at least about 250 meters per second. More desirably, the velocity of the heated aqueous solution 20 exiting the nozzle 44 should be at least about 450 meters per second. The extruded filament 98 forms a bulge 100, see FIG. 19, immediately upon exiting the hollow cylindrical tube 46. A number of factors contribute to this bulge 100 being formed. Such factors include but are not limited to: friction between the aqueous solution 20 and the inside diameter d of the hollow cylindrical tube 46, the velocity of the aqueous solution 20, the viscosity of the aqueous solution 20, the inside diameter d of the hollow cylindrical tube 46, gravity acting on the aqueous solution 20, etc.

The extruded filament 98 is at least partially shrouded, and desirably, completely shrouded, by the pressurized gas 34 emitted through the first opening 62 which surrounds each of the nozzles 44. The pressurized gas 34 can be heated to a temperature of at least about 100° C. Desirably, the pressurized gas 34 is heated to a temperature of at least about 120° C. More desirably, the pressurized gas 34 is heated to the same temperature as that of the heated aqueous solution 20. The pressurized gas 34 is emitted as gas streams 102 aligned essentially parallel to the filament 98. The pressurized gas streams 102 form a veil or curtain around at least a portion of the circumference of the filament 98. Desirably, the pressurized gas streams 102 form a veil or curtain around the entire circumference of the filament 98. The pressurized gas 34, which is desirably air, is emitted from each of the first openings 62 at a velocity of at least 45 meters per second as was explained earlier. The pressurized gas streams 102, along with gravity, will attenuate and accelerate each of the filaments 98 into a circular cross-sectional configuration having a diameter of less than about 15 microns. Desirably, each of the filaments 98 will have a diameter of from between about 0.5 microns to about 10 microns. More desirably, each of the filaments 98 will have a diameter of from between about 1 micron to about 8 microns. Still more desirably, each of the filaments 98 will have a diameter of from between about 1 micron to about 5 microns. Most desirably, each of the filaments 98 will have a diameter of from between about 1 micron to about 3 microns.

Still referring to FIG. 19, the attenuation and acceleration will occur over a predetermined distance h. The actual amount of attenuation and the acceleration can vary. Both the amount of attenuation and the acceleration can be calculated and can be adjusted to obtain a cellulose fiber 12 having a predetermined diameter. The distance h can vary depending upon a number of factors, including but not limited to: the composition of the heated aqueous solution 20, the finish diameter of the cellulose fibers, the temperature of the filament 98, the inside diameter of the hollow cylindrical tube 46, etc. The distance h can range from between about 3 centimeters to about 3 meters. Desirably, the distance h should range from between about 15 centimeters to about 2 meters. More desirably, the distance h should range from between about 20 centimeters to about 1.5 meters. Even more desirably, the distance h should range from between about 30 centimeters to about 1 meter.

The process 10 further includes extruding the heated aqueous solution 20 downward from each of the nozzles 44 parallel to a longitudinal central axis $X_3$-$X_3$ and contacting each of the filaments 98 with a liquid 104. The liquid 104 causes each of the filaments 98 to coagulate into a continuous solid fiber 12. The liquid 104 can be water, alcohol or a solution having a high concentration of water. The temperature of the liquid 104 can be adjusted to suit one's particular needs. For example, the liquid 104 can be at room temperature. Alternative, the liquid 104 could be cooler than room temperature. The velocity of the liquid 104 can also vary. It has been found in some applications that using a pressurized liquid 104 produces a better chemical reaction between the filaments 98 and the liquid 104. For example, the liquid 104 can be introduced as a hydro jet. By "hydro jet" it is meant a jet of pressurized liquid or mixture of liquid and air. The liquid 104 causes a major portion of the solvent 18 to solvate into the liquid solution and thus allow the filaments 98 to transform or coagulate into a continuous solid fiber. The amount of solvent 18 that is actually removed by the liquid 104 can vary depending upon the percentage of solvent 18 present in the heated aqueous solution 20. Desirably, at least 75% of the solvent present in the heated aqueous solution 20 will be removed. More desirably, at least about 80% of the solvent present in the heated aqueous solution 20 will be removed. Even more desirably, at least about 85% of the solvent present in the heated aqueous solution 20 will be removed. Most desirably, at least about 90% of the solvent present in the heated aqueous solution 20 will be removed.

For example, if the heated aqueous solution 20, as it leaves the nozzle 44, includes about 85% solvent, about 10% cellulose and about 5% water, then once the filament 98 is contacted with the liquid 104, the percentages can change to about 10% solvent, about 10% cellulose and about 80% water. In order to remove all of the solvent 18 that is present in each of the filaments 98, one will normally have to subject the cellulose fibers 12 to additional washing steps.

Each of the filaments 98 should be contacted with the liquid 104 at a distance h of at least about 3 centimeters from each of the nozzles 44. The liquid 104 can be introduced at an angle alpha α. The angle α can range from between about 5 degrees to about 175 degrees as measured from the longitudinal central axis $X_3$-$X_3$. Desirably, the angle α can range from between about 10 degrees to about 135 degrees as measured from the longitudinal central axis $X_3$-$X_3$. More desirably, the angle α can range from between about 25 degrees to about 90 degrees as measured from the longitudinal central axis $X_3$-$X_3$. Even more desirably, the angle α can range from between about 30 degrees to about 60 degrees as measured from the longitudinal central axis $X_3$—$X_3$. The angle α can be an acute angle or an obtuse angle as measured from the hollow, cylindrical tube 46.

Referring again to FIGS. 2 and 19, as each of the filaments 98 is extruded from each of the hollow cylindrical tubes 46 and each is attenuated and accelerated by the pressurized gas 34 exiting through the first openings 62 as the pressurized gas streams 102. Additional pressurized gas 34 is emitted from each of the second openings 64. The pressurized gas emitted from each of the second openings 64 limits or prevents each of the filaments 98 from physically contacting one another. This decreases the possibility that two or more of the filaments 98 can contact or touch one another and form ropes and/or bundles of filaments 98. It is desirable that each of the filaments 98 be kept separate and distinct from adjacent filaments 98. By doing so, one can produce a multitude of individual cellulose fibers 12 each having essentially the same diameter.

The pressurized gas 34 emitted through each of the second openings 64 will shroud or assist in keeping adjacent filaments 98 separate from one another. The pressurized gas 34 emitted from each of the second openings 64 can also be heated so that it has an elevated temperature. The temperature of the pressurized gas 34 emitted from each of the second openings 64 can be equal to or closely match the temperature of the pressurized gas streams 102. Alternatively, the temperature of the pressurized gas 34 emitted from each of the second openings 64 can be at a higher or a lower temperature than the temperature of the pressurized gas streams 102.

Likewise, the velocity of the pressurized gas 34 emitted from each of the second openings 64 can be adjusted to be less than, equal to or be greater than the velocity of the pressurized gas streams 102. Desirably, the velocity of the pressurized gas 34 emitted from each of the second openings 64 is essentially equal to the velocity of the pressurized gas streams 102. Furthermore, the velocity of the pressurized gas 34 emitted from each of the first and second openings, 62 and 64 respectively, can be less than, equal to or greater than the velocity of the heated aqueous solution 20 extruded from each of the nozzles 44. Desirably, the velocity of the pressurized gas 34 emitted from each of the first and second openings, 62 and 64 respectively, is greater than the velocity of the heated aqueous solution 20 extruded from each of the nozzles 44.

Still referring to FIGS. 1 and 19, the continuous cellulose fibers 12 are still relatively soft and wet when they are collected on a moving surface 106. The moving surface 106 can be a conveyor belt 108, as illustrated, or be some other type of moving member, such as a rotatable drum. The moving surface 106, i.e. the conveyor belt 108 or the rotatable drum, can be porous so that water can easily pass therethrough. The moving surface 106 can be constructed so as to be able to move at different speeds. As the continuous, coagulated cellulose fibers 12 contact the moving surface 106 they will accumulate to form a non-woven web 110. The loft or thickness t of the non-woven web 110, see FIG. 19, will vary depending upon the speed of the moving surface 106. For example, the slower the speed of the moving surface 106, the greater the loft or thickness t of the non-woven web 110 will be. Likewise, as the speed of the moving surface 106 is increased, the loft or thickness of the non-woven web 110 will decrease.

The distance between the nozzles 44 and the moving surface 106 is commonly referred to in the industry as the "die to collector" distance. This distance, denoted $h_1$ in FIG. 19, can range from between about 15 centimeters to about 3 meters. Desirably, the distance $h_1$ is from between about 20 centimeters to about 1 meter. More desirably, the distance $h_1$ is from between about 25 centimeters to about 120 centimeters. Even more desirably, the distance $h_1$ is from between about 30 centimeters to about 90 centimeters. Most desirably, the distance $h_1$ is at least 50 centimeters.

The non-woven web 110 can be constructed to have an open pore structure. The size and quantity of the pores can vary. The non-woven web 110 can be an entangled accumulation of the coagulated cellulose fibers 12. By "non-woven" it is meant that the fibers 12 are not arranged or weaved into a set pattern. The non-woven web 110 can be constructed of 100% cellulose fibers 12 or be a combination of cellulose fibers 12 and polymers fibers. The polymers fibers (not shown) can be extruded from another extruder which is positioned upstream or downstream from the die block/spinnerette assembly 26, see FIG. 1. The polymers fibers can be polyolefin fibers, such as polyethylene and polypropylene fibers, or they can be bicomponent fibers, etc. The percentage of the various cellulose and polymer fibers can vary to suit one's particular needs and requirements.

It should be understood that the cellulose fibers 12 can be combined with a polymer to form a bicomponent fiber as well.

The process 10 can be started up by heating the aqueous solution 20 to a predetermined temperature. The aqueous solution 20 can be heated to an elevated temperature of from between about 80° C. to about 140° C. Desirably, the aqueous solution 20 is heated to a temperature of at least 100° C. More desirably, the aqueous solution 20 is heated to a temperature of at least about 110° C. Even more desirably, the aqueous solution 20 is heated to a temperature of about 120° C. Simultaneously or sequentially, the pressurized gas 34 can be heated to an elevated temperature. The elevated temperature can be at least 100° C. or higher. Desirably, the elevated temperature of the pressurized gas 34 is about 110° C. More desirably, the elevated temperature of the pressurized gas 34 is about 120° C. The heated aqueous solution 20 is then directed through the die block/spinnerette assembly 26 to the first member or spinnerette 42. At the first member or spinnerette 42, the heated aqueous solution 20 is extruded through each of the multitude of the hollow cylindrical tubes 46 which form the nozzles 44. The heated aqueous solution 20 is extruded through each of the hollow cylindrical tubes 46 at a back pressure of from between about 5 bar to about 200 bar. Desirably, the back pressure is higher than 20 bar. More desirably, the back pressure is higher than 30 bar. Even more desirably, the back pressure is higher than 40 bar. The heated pressurized gas 34 is simultaneously routed through each of the first and second openings, 62 and 64 respectively, at a velocity of from between about 1 meter per second to about 10 meters per second. The velocity of the heated pressurized gas 34 is then gradually increased until the pressurized gas 34 reaches a velocity of at least about 45 meters per second. At this time, production grade cellulose fibers 12 can be extruded.

Shutting down the process 10 can be accomplished by turning off the heat used to heat the pressurized gas 34. The velocity of the pressurized gas 34 is then gradually reduced down to 0 meters per second. The flow of the heated aqueous solution 20 flowing through each of the nozzles 44 is then stopped. The heated aqueous solution 20 is then allowed to cool down to room temperature. At this time the various lines or hoses which route the heated aqueous solution 20 to the die block/spinnerette assembly 26 can be flushed or purged. It is important to flush or purge such lines or hoses, especially if the dope delivery mechanism 24 is to be inoperative for an extended period of time.

Figure 20:
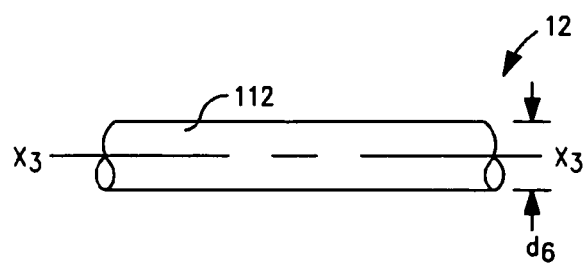
FIG. 20 is a plane view of a coagulated cellulose fiber.

Referring to FIG. 20, a coagulated cellulose fiber 12 is shown having a circular cross-sectional configuration with a diameter $d_6$. The diameter $d_6$ of the cellulose fiber 12 should be less than about 15 microns. Desirably, the diameter $d_6$ of the cellulose fiber 12 is less than about 10 microns. More desirably, the diameter $d_6$ of the cellulose fiber 12 ranges from between about 0.5 microns to about 8 microns. Even more desirably, the diameter $d_6$ of the cellulose fiber 12 ranges from between about 0.5 microns to about 5 micron. Most desirably, the diameter $d_6$ of the cellulose fiber 12 ranges from between about 0.5 microns to about 4 microns.

The cellulose fiber 12 has a uniformly smooth outer surface 112 when viewed at a magnification of 100×. The coagulated cellulose fiber 12, before contacting the moving surface 106, contains less than about 20% of the water soluble solvent 18. In other words, the concentration of the solvent 18 is measured immediately after the filament 98 is coagulated into a solid fiber 12. Desirably, the coagulated cellulose fiber 12, before contacting the moving surface 106, contains less than about 15% of the water soluble solvent 18. More desirably, the coagulated cellulose fiber 12, before contacting the moving surface 106, contains less than about 10% of the water soluble solvent 18. Even more desirably, the coagulated cellulose fiber 12, before contacting the moving surface 106, contains less than about 8% of the water soluble solvent 18.

As mentioned above, each of the cellulose fibers 12 is formed from a heated aqueous solution 20 that can vary in composition. The aqueous solution 20 can include from between about 5% to about 35% cellulose, from about 60% to 90% solvent 18, and from between about 5% to about 35% water. Typically, the aqueous solution will contains about 10% cellulose, about 85% solvent and about 5% water. The most common water soluble solvent 18 is N-methyl-morpholine-N-oxide (NMMO).

The heated aqueous solution 20 is extruded through the first member or spinnerette 42 at a throughput of greater than 0.1 grams/hole/minute at a production speed of up to 750 meters per minute. Desirably, the heated aqueous solution 20 is extruded through the first member or spinnerette 42 at a throughput of greater than 0.5 grams/hole/minute at a production speed of up to 750 meters per minute. More desirably, the heated aqueous solution 20 is extruded through the first member or spinnerette 42 at a throughput of greater than 1 gram/hole/minute at a production speed of up to 750 meters per minute. Immediately after being extruded from each of the nozzles 44, the heated aqueous solution 20 is formed into a filament 98. The filament 98 is attenuated and accelerated by gravity and by the adjacent pressurized gas streams 102 exiting from the first openings 62. Each of the filaments 98 are coagulated by the liquid 104 into a continuous, solid fiber 12. This solid fiber 12 is still soft and wet and contains less than 20% of the water soluble solvent 18.

Referring again to FIG. 1, the multiple continuous cellulose fibers 12 are collected on the moving surface 106 to form the non-woven cellulose web 110. The non-woven cellulose 110 web contains less than about 20% solvent. The non-woven cellulose web 110 has a basis weight of at least about 1 gram per square meter (gsm). Alternatively, the non-woven cellulose web 110 has a basis weight of at least about 1.25 gsm. Still alternatively, the non-woven cellulose web 110 has a basis weight of at least about 1.5 gsm or higher.

The non-woven cellulose web 110 is directed to a wash station 114 where an additional liquid, desirably in the form of water, is brought into contact with the non-woven cellulose web 110. This additional liquid mixes with the residual solvent 18 and reduces the concentration of the solvent 18 to less than 10%. Desirably, the concentration of the solvent 18 in the cellulose fiber 12 is reduced to less than 5%. More desirably, the concentration of the solvent 18 in the cellulose fiber 12 is reduced to less than 3%. Even more desirably, the concentration of the solvent 18 in the cellulose fiber 12 is reduced to less than 1%.

It should be noted that the non-woven cellulose web 110 can be subjected to additional washing stations so that over 99% of the solvent 18 is removed.

After the concentration of the solvent 18 has been reduced to a preselected value or until essentially all of the solvent 18 is removed from the non-woven cellulose web 110, the non-woven web 110 is dried in a dryer 116. The non-woven cellulose web 110 can be dried using heated air, steam, moving air, contact with another member such as a felt or a cloth, etc. Other means of drying the non-woven cellulose web 110 that are known to those skilled in the art can also be used.

Each of the cellulose fibers 12 is white or off white in color. A colorant can be added to the heated aqueous solution 20 or to the filaments 98 to form cellulose fibers 12 of a particular color, if desired.

The non-woven cellulose web 110 can be subjected to other mechanical methods, if desired. For example, the non-woven cellulose web 110 can be hydroentangled. Furthermore, the non-woven cellulose web 110 can be subjected to any paper making procedure, including but not limited to: being perforated, being punched, being stamped, being embossed, being printed, being coated, etc. After being so treated, the non-woven cellulose web 110 can be wound up into a supply roll 118. The supply roll 118 can be loaded and transported in a semi-trailer or in a railroad car to a manufacturer, distributor or consumer, or the supply roll 118 can be stored until it is ready to be shipped to a consumer.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A process of forming a non-woven cellulose web, comprising the steps of:
    a) forming an aqueous solution of cellulose and a solvent;
    b) directing said aqueous solution through a first member having multiple rows of first and second openings, each of said first openings having a nozzle positioned therein and each of said second openings having a stationary pin positioned therein, and at least one of said nozzles in a row being staggered from at least one of said nozzles in an adjacent row;
    c) extruding said aqueous solution through each of said nozzles to form multiple filaments;
    d) shrouding at least a portion of each of said filaments in a pressurized gas emitted through a second member, said second member having multiple openings surrounding each of said nozzles and multiple corridors surrounding each of said stationary pins;
    e) attenuating said filaments into a circular cross-sectional configuration having a diameter of less than about 15 microns;
    f) contacting said filaments with a liquid, said liquid mixing with said solvent to remove some of said solvent whereby each of said filaments is transformed into a continuous solid fiber; and
    g) collecting said continuous solid fibers on a moving surface to form a non-woven cellulose web.

2. The process of claim 1 further comprising heating said aqueous solution to a temperature of from between about 80° C. to about 140° C. and heating said pressurized gas to a temperature of at least about 120° C.

3. The process of claim 1 further comprising extruding said aqueous solution through each of said nozzles at a throughput of greater than 0.1 grams/hole/minute and at a production speed of up to 750 meters per minute.

4. The process of claim 1 further comprising extruding said aqueous solution through each of said nozzles at a throughput of greater than 0.5 grams/hole/minute and at a production speed of up to 750 meters per minute.

5. The process of claim 1 further comprising emitting said pressurized gas through each of said multiple openings at a velocity of at least 45 meters per second and at a back pressure exceeding 5 bar, and each of said multiple openings includes at least two crescent shaped slots.

6. The process of claim 1 further comprising emitting said pressurized gas through each of said multiple corridors at a velocity of at least 45 meters per second and at a back pressure exceeding 5 bar.

7. The process of claim 1 wherein said pressurized gas is pressurized air which is emitted from each of said multiple openings essentially parallel to said filament extruded through each of said nozzles, and said pressurized air accelerates and attenuates each of said filaments.

8. The process of claim 7 further comprising contacting each of said filaments with a liquid which causes said filaments to coagulate into a continuous solid fiber, said liquid being introduced at an obtuse angle.

9. The process of claim 8 wherein said liquid is water, and each of said filaments is contacted with said water at a distance of at least about 3 centimeters from each of said nozzle.

10. A process of forming a non-woven cellulose web, comprising the steps of:
    a) forming an aqueous solution of cellulose and a solvent, said aqueous solution having a temperature of at least about 100° C.;
    b) directing said aqueous solution through a first member having multiple rows of first and second openings, each of said first openings having a nozzle positioned therein and each of said second openings having a stationary pin positioned therein, and at least one of said nozzles in a row being staggered from at least one of said nozzles in an adjacent row;
    c) extruding said aqueous solution through each of said nozzles at a back pressure of at least 10 bar to form multiple filaments;
    d) shrouding at least a portion of each of said filaments in a pressurized gas emitted through a second member, said second member having multiple openings surrounding each of said nozzles and multiple corridors surrounding each of said stationary pins;
    e) attenuating said filaments into a circular cross-sectional configuration having a diameter of less than about 5 microns;
    f) contacting said filaments with a liquid, said liquid mixes with said solvent to remove some of said solvent whereby each of said filaments is transformed into a continuous solid fiber; and
    g) collecting said continuous solid fibers on a moving surface to form a non-woven cellulose web.

11. The process of claim 10 wherein said pressurized gas emitted from each of said multiple openings and from said multiple corridors prevents each of said filaments from physically contacting one another.

12. The process of claim 10 further comprising extruding said aqueous solution downward from each of said nozzles parallel to a longitudinal central axis and contacting each of said filaments with water introduced at an obtuse angle, said water causing each of said filaments to coagulate into a continuous solid fiber.

13. The process of claim 10 further comprising heating said pressurized gas to a temperature from between about 120° C. to about 160° C. and extruding said aqueous solution through each of said nozzles at a production speed of up to 750 meters per minute.

14. The process of claim 10 wherein said moving surface is a rotatable drum having a porous surface.

15. The process of claim 10 wherein said moving surface is a conveyor belt having a porous surface.

16. The process of claim 1 further comprising starting up said process by:
 a) heating said aqueous solution to a predetermined temperature above 80° C.;
 b) directing said heated aqueous solution to said first member and extruding said heated aqueous solution through each of said nozzles at a back pressure of at least 10 bar;
 c) routing said pressurized gas through each of said first and second openings at a velocity of from between about 1 meter per second to about 10 meters per second;
 d) heating said pressurized gas to a temperature of about 100° C.; and
 e) gradually increasing said velocity of said heated pressurized gas until said pressurized gas reaches a velocity of at least about 45 meters per second.

17. The process of claim 1 further comprising shutting down said process by:
 a) turning off said heat used to heat said pressurized gas;
 b) gradually reducing said velocity of said pressurized gas to 0 meters per second;
 c) stopping said aqueous solution from flowing through each of said nozzles; and
 d) allowing said aqueous solution to cool to room temperature.

\* \* \* \* \*